(12) United States Patent
Chaverot et al.

(10) Patent No.: US 8,273,809 B2
(45) Date of Patent: Sep. 25, 2012

(54) THERMOREVERSIBLY CROSSLINKED BITUMEN/POLYMER COMPOSITION

(75) Inventors: Pierre Chaverot, Sainte Croix en Jarez (FR); Charlotte Godivier, Malakoff (FR); Ludwik Leibler, Paris (FR); Ilias Iliopoulos, Paris (FR); Amanda Kathryn Leach, Scotia, NY (US)

(73) Assignees: Total Raffinage Marketing, Puteaux (FR); Centre National de la Recherche Scientifique (CNRS), Paris (FR)

( * ) Notice: Subject to any disclaimer, the term of this patent is extended or adjusted under 35 U.S.C. 154(b) by 96 days.

(21) Appl. No.: 12/670,382

(22) PCT Filed: Jul. 17, 2008

(86) PCT No.: PCT/FR2008/001052
§ 371 (c)(1), (2), (4) Date: Jan. 22, 2010

(87) PCT Pub. No.: WO2009/030840
PCT Pub. Date: Mar. 12, 2009

(65) Prior Publication Data
US 2010/0197835 A1      Aug. 5, 2010

(30) Foreign Application Priority Data

Jul. 24, 2007  (FR) .................................... 07 05367

(51) Int. Cl.
*E01C 7/26* (2006.01)
(52) U.S. Cl. ......................................... 524/68; 524/504
(58) Field of Classification Search .................... 524/68, 524/504
See application file for complete search history.

(56) References Cited

U.S. PATENT DOCUMENTS

| | | | |
|---|---|---|---|
| 4,145,322 A | 3/1979 | Maldonado et al. |
| 4,242,246 A | 12/1980 | Maldonado et al. |
| 4,599,291 A | 7/1986 | Podszün et al. |
| 4,617,354 A | 10/1986 | Augustin et al. |
| 5,087,652 A | 2/1992 | Christell |
| 5,756,565 A | 5/1998 | Germanaud et al. |
| 5,883,162 A | 3/1999 | Planche et al. |
| 6,020,404 A | 2/2000 | Planche et al. |
| 7,417,081 B2 | 8/2008 | Nakajima et al. |
| 2002/0045699 A1 | 4/2002 | Scholl et al. |

FOREIGN PATENT DOCUMENTS

| | | |
|---|---|---|
| EP | 0 157 269 | 10/1985 |
| EP | 0 690 892 | 1/1996 |
| EP | 0 799 280 | 10/1997 |
| EP | 0 837 909 | 4/1998 |
| EP | 0 870 793 | 10/1998 |
| EP | 1 110 973 | 6/2001 |
| EP | 1 350 813 | 10/2003 |
| EP | 1 572 807 | 9/2005 |
| EP | 1 576 058 | 9/2005 |
| FR | 2 376 188 | 7/1978 |
| FR | 2 558 845 | 8/1985 |
| FR | 2 849 047 | 6/2004 |
| FR | 2 849 048 | 6/2004 |
| IT | 1121867 | 4/1986 |
| JP | 50-139135 | 11/1975 |
| JP | 51-19035 | 2/1976 |
| JP | 52-65549 | 5/1977 |
| JP | 56-014573 | 2/1981 |
| JP | 57-158275 | 9/1982 |
| JP | 11-106578 | 4/1999 |
| WO | WO 97/14754 | 4/1997 |
| WO | WO 2009/016281 | 2/2009 |

*Primary Examiner* — Peter D Mulcahy
(74) *Attorney, Agent, or Firm* — Harness, Dickey & Pierce, P.L.C.

(57) ABSTRACT

The disclosure relates to a bitumen/polymer composition comprising at least one bitumen and at least one graft polymer, the grafts enabling the bitumen/polymer compositions to be thermoreversibly cross-linked. The disclosure also relates to the use of said bitumen/polymer compositions in fields of application relating to roads, especially in the production of asphalt binders, and in industrial fields of application. The disclosure further relates to the method for producing said thermoreversibly cross-linked bitumen/polymer compositions.

15 Claims, No Drawings

THERMOREVERSIBLY CROSSLINKED BITUMEN/POLYMER COMPOSITION

CROSS-REFERENCE TO RELATED APPLICATIONS

This application is a National Phase Entry of International Application No. PCT/FR2008/001052, filed on Jul. 17, 2008, which claims priority to French Application 07 05 367, filed on Jul. 24, 2007, both of which are incorporated by reference herein.

TECHNICAL FIELD

The present invention belongs to the field of bitumens/polymers. More specifically, it relates to thermoreversibly crosslinked bitumen/polymer compositions. The invention also relates to the use of these bitumen/polymer compositions in the fields of highway applications, in particular in the production of road binders, and in the fields of industrial applications. The invention also relates to the process for the preparation of these thermoreversibly crosslinked bitumen/polymer compositions.

TECHNICAL BACKGROUND

The use of bitumen in the production of materials for highway and industrial applications has been known for a long time: bitumen is the main hydrocarbon binder used in the field of road construction or civil engineering. To be able to be used as a binder in these different applications, the bitumen must have certain mechanical properties, in particular elastic or cohesive properties. Since bitumen on its own is generally not sufficiently elastic or cohesive, polymers are added which can optionally be crosslinked. These polymers, crosslinked or not, provide improved elastic and cohesive properties to the bitumen/polymer compositions. Generally, the crosslinking is irreversible; once the crosslinking has been carried out, it is not possible to return to the initial state existing before the crosslinking reaction. Crosslinked bitumen/polymer compositions thus have good mechanical properties, but their viscosity is very high. In fact, the two characteristics "mechanical properties" on the one hand, and "fluidity" on the other hand, are contradictory. The mechanical properties (elasticity and cohesion), are promoted by long chain lengths, therefore by crosslinking of the polymer chains. Fluidity is promoted by a short chain length, therefore by an absence of crosslinking or a weak crosslinking of the polymer chains. According to the applications envisaged, it is necessary to find a good compromise between mechanical properties and fluidity by adjusting the rate or the nature of the crosslinking.

PRIOR ART

Crosslinking according to the prior art is usually irreversible crosslinking based on the formation of covalent bonds between the polymer chains. Thus, one of the crosslinkings most used in the field of bitumens is sulphur crosslinking or vulcanization. In sulphur crosslinking, more or less short sulphur chains (in general having 8 to 2 atoms of sulphur) covalently bond the polymer chains. By altering the chemical nature of the donor of the sulphur and/or the polymer, the temperature, the concentration of the polymer and/or of the sulphur donors, the Applicant has thus developed and patented a large number of crosslinked bitumen/polymer compositions having clearly improved properties with respect to bitumen without polymers and with respect to the non-crosslinked bitumen/polymer physical mixture. Among the Applicant's patents, there can be mentioned the following references in particular: FR2376188, FR7818534, EP0799280, EP0690892.

Novel thermoreversibly crosslinked polymers have recently been developed. Most of the thermoreversible crosslinking is carried out using thermoreversible covalent bonds. There are also thermoreversible crosslinkings which are carried out via coordination bonds or ionic bonds.

Thus, JP 11106578 describes the modification of a polyolefin by an acid anhydride which reacts in the presence of alcohols to form thermoreversible ester bonds. EP 870793 describes a mixture of a first polymer having at least two acid functions and a second polymer having at least two amine functions so as to form stable amide groups at low temperature which can be dissociated at high temperature. FR2558845 describes the reaction between a divinyl ether and a copolymer bearing acid functions. The acyl obtained is stable at low temperature and decomposes when the temperature is increased. Other thermoreversibly crosslinked polymers involve polymers comprising carboxylic acid units which bond reversibly to metals (JP 50139135, JP 51019035, JP 56014573). Others still involve labile ionic bonds between acid groups and amine groups (JP 52065549, JP57158275).

OBJECTIVES OF THE INVENTION

In these circumstances, the present invention relates to obtaining thermoreversibly crosslinked bitumen/polymer compositions. Another objective of the invention is to propose bitumen/polymer compositions having the properties of reversibly crosslinked bitumen/polymer compositions at operating temperatures, in particular with respect to elasticity and/or cohesion, and having a reduced viscosity at processing temperatures. Another objective of the invention is to propose a simple process for the preparation of thermoreversibly crosslinked bitumen/polymer compositions.

BRIEF DESCRIPTION

The Applicant company has developed novel thermoreversible crosslinked bitumen/polymer compositions. The bitumen/polymer compositions obtained have the properties of conventional crosslinked bitumen/polymer compositions at operating temperatures, and the properties of non-crosslinked bitumen/polymer compositions at processing temperatures.

Firstly, the invention relates to a bitumen/polymer composition comprising at least one bitumen and at least one graft polymer GP comprising a polymer main chain P and at least one side graft G bonded to the polymer main chain, the graft comprising a branched, linear or saturated hydrocarbon chain, having at least 18 carbon atoms. Preferably, the branched, linear or saturated hydrocarbon chain with at least 18 carbon atoms of the graft has the general formula $C_nH_{2n+1}$, where n represents an integer greater than or equal to 18, preferably varying from 18 to 110. The graft polymer GP results from the reaction between at least one reactive function of a polymer P and a reactive function of a graft G, the reactive functions of the polymer P and the graft G being chosen from double bonds, epoxides, acid anhydrides, carboxylic acids, esters, amides, thiols, alcohols and amines.

The polymer P results from the polymerization of units comprising reactive functions chosen from double bonds, epoxides, acid anhydrides, carboxylic acids, esters, amides, thiols, alcohols and amines, in particular double bonds. The polymer P results in particular from the copolymerization of diene units, preferably conjugated diene. Preferably, the polymer P results from the copolymerisation of conjugated diene units and aromatic monovinyl hydrocarbon units.

The conjugated diene units are chosen from those comprising 4 to 8 carbon atoms per monomer, for example butadiene, 2-methyl-l, 3-butadiene(isoprene), 2,3-dimethyl-l,3-butadiene, 1,3-pentadiene and 1,3-hexadiene, chloroprene and mixtures thereof, in particular butadiene. The aromatic monovinyl hydrocarbon units are chosen from styrene, o-methyl styrene, p-methyl styrene, p-tert-butyl styrene, 2,3 dimethyl styrene, α-methyl styrene, vinyl naphthalene, vinyl toluene, vinyl xylene, and similar or mixtures thereof, in particular styrene. Preferably, the polymer main chain of the polymer P comprises double bonds, in particular pendant vinyl double bonds originating from the 1-2 addition of conjugated diene units, in particular butadiene units.

Preferably, the polymer P has a styrene content by weight of 5% to 50%. Preferably, the polymer P has a butadiene content by weight of 50% to 95%. Preferably, the polymer P has a content by weight of pendant vinyl double-bond units originating from the 1-2 addition of butadiene from 5% to 50%.

According to a variant of the invention, the graft G has the general formula $C_nH_{2n+1}$—XH where X represents a sulphur atom, an oxygen atom or the NH group and n represents an integer varying from 18 to 110. In another embodiment, the graft G has the general formula $C_nH_{2n+1}$—$(OCH_2CH_2)_m$—XH where X represents a sulphur atom, an oxygen atom or the NH group, n represents an integer varying from 18 to 110 and m represents an integer varying from 1 to 20.

Preferably, the graft polymer GP is obtained by reaction between at least one double bond of polymer P, in particular a pendant vinyl double bond originating from the 1-2 addition of a conjugated diene unit of polymer P and a reactive function of a graft G chosen from the thiol, alcohol or amine functions. Preferably, the graft polymer GP is obtained by reaction between at least one double bond of polymer P, in particular a pendant vinyl double bond originating from the 1-2 addition of a butadiene unit of polymer P and a thiol function, preferably terminal, of a graft G. Preferably, the graft polymer GP is obtained by reaction between at least one double bond of polymer P, in particular a pendant vinyl double bond originating from the 1-2 addition of a butadiene unit of polymer P and a graft G of general formula $C_nH_{2n+1}$—XH where X represents a sulphur atom, an oxygen atom or an NH group and n represents an integer varying from 18 to 110.

Preferably, the graft polymer GP comprises at least two grafts per main polymer chain. Preferably, the content of graft polymer GP by weight with respect to the bitumen is from 0.1 to 30%, preferably 1 to 10%. The bitumen/polymer composition comprises moreover at least one flux (fluxing agent). The bitumen is chosen from atmospheric distillation residues, vacuum distillation residues, visbroken residues, blown residues, de-asphalting residues, mixtures and combinations thereof.

The invention relates moreover to a process for the preparation of thermoreversibly crosslinked bitumen/polymer compositions. Two preparation processes are envisaged. In the so-called "ex situ" process the graft polymer GP is introduced into the bitumen. In the so-called "in-situ" process, the polymer P and the graft G are introduced into the bitumen, the grafting reaction taking place in the bitumen.

Preferably, the ex situ preparation process is such that:

a) a bitumen is introduced into a receiving vessel equipped with mixing means, and the bitumen is taken to a temperature comprised between 90 and 220° C., preferably between 140 and 180° C.,
b) from 0.1 to 30%, preferably 0.1 to 10% by mass of a graft polymer GP with respect to the mass of bitumen is introduced,
c) the composition is heated at a temperature comprised between 90 and 220° C., preferably between 140 and 180° C., under stirring, until a homogeneous final bitumen/polymer composition is obtained.

Preferably, the in situ preparation process is such that:

a) a bitumen is introduced into a receiving vessel equipped with mixing means, and the bitumen is taken to a temperature between 90 and 220° C., preferably between 140 and 180° C.,
b) from 0.1 to 30%, preferably 0.1 to 10% by mass of a polymer P and 0.1 to 30%, preferably 0.1 to 10% by mass of a graft G with respect to the mass of bitumen are introduced,
c) the composition is heated at a temperature comprised between 90 and 220° C., preferably between 140 and 180° C., under stirring, until a homogeneous final bitumen/polymer composition is obtained.

Finally, the invention relates to the use of bitumen/polymer compositions according to the invention in order to produce a bituminous binder, capable of being implemented as it is, in anhydrous form, in emulsion form or in fluxed bitumen form. These bituminous binders can then be combined in a mixture with aggregates in order to produce a surface dressing, a hot mix, a cold mix, a cold-cast mix, a gravel emulsion. Applications of the bitumem/polymer according to the invention are capable of use in highway applications or industrial applications in order to produce a wearing course, a sealing membrane, a membrane or an impregnation layer.

DETAILED DESCRIPTION

The bitumen/polymer compositions comprise a graft polymer GP. By graft polymer is meant a polymer which comprises a polymer main chain and side grafts bonded to this chain. The grafts are bonded directly to the main chain of the polymer. The polymer main chain is obtained by polymerisation of several monomers. The grafts are then grafted to the polymer main chain, after polymerisation of the latter, by chemical reaction. The result is a covalent bond between the grafts and the polymer main chain. The graft polymers according to the invention are thus obtained by polymerization, then grafting of the grafts, and not by polymerization of monomers already comprising grafts.

The graft polymer GP according to the invention results from the reaction between at least one reactive function of a polymer P and a reactive function of a graft G. The reactive functions present on the polymer P and/or on the graft G are chosen from double bonds, epoxides, acid anhydrides, carboxylic acids, esters, amides, thiols, alcohols and amines. In particular, the reactive functions present on the polymer are chosen from double bonds. Preferably, the reactive functions present on the graft G are chosen from epoxides, acid anhydrides, carboxylic acids, esters, amides, thiols, alcohols and amines, preferably thiols, alcohols and amines, preferably thiols.

The reactive function(s) present on the polymer P is/are situated along the polymer P chain while the reactive function(s) of the graft G is/are preferably terminal i.e. situated at the ends of the molecule. Preferably the graft G has only one terminal reactive function while the polymer P has several reactive functions. The grafts are bonded directly to the polymer main chain by reaction between their reactive functions, via a covalent bond.

The polymers according to the invention result from polymerization (homopolymerization, copolymerization, terpolymerization, etc) of units (or monomers) comprising reactive functions chosen from double bonds, epoxides, acid anhydrides, carboxylic acids, esters, amides, thiols, alcohols and amines, in particular double bonds. Among the polymers which can be used according to the invention, there can be mentioned for example polybutadienes, polyisoprenes, butyl rubbers, polyacrylates, polymethacrylates, polychloroprenes, polynorbornenes, ethylene and vinyl acetate copolymers, ethylene and methyl acrylate copolymers, ethylene and butyl acrylate copolymers, ethylene and maleic anhydride copolymers, ethylene and glycidyl methacrylate copolymers, ethylene and glycidyl acrylate copolymers, ethylene/propene/diene (EPDM) terpolymers, acrylonitrile/butadiene/styrene (ABS) terpolymers, ethylene/acrylate or alkyl methacrylate/acrylate or glycidyl methacrylate terpolymers and in particular ethylene/methyl acrylate/glycidyl methacrylate terpolymers and ethylene/alkyl acrylate or methacrylate/maleic anhydride terpolymers and in particular ethyl/butyl acrylate/maleic anhydride terpolymers. The polymers P can also be those described in the Applicant's patents EP1572807, EP0837909, and EP1576058.

The preferred polymers P can also be those resulting in particular from the polymerization of diene units, preferably conjugated diene. These polymers are thus obtained from at least one diene unit (or monomer), preferably conjugated diene. In a variant of the invention, the polymers can result from homopolymerization of diene units only, preferably conjugated diene. In these polymers, along the polymer chain a number of double bonds resulting from the homopolymerization of diene units, preferably conjugated diene are present. Such polymers are for example polybutadienes, polyisoprenes, polyisobutenes, polychloroprenes, but also butyl rubbers which are obtained by the concatenation of isobutene and isoprene copolymers. Copolymers or terpolymers obtained from diene units are also present such as butadiene, isoprene, isobutene, 2,3-dimethyl-1,3-butadiene, 1,3-pentadiene, 1,3-hexadiene, chloroprene units.

In another variant of the invention, the polymers can also result from copolymerisation or terpolymerization of diene units, preferably conjugated diene, and other units containing other reactive functions. These reactive functions will be chosen for example from double bonds, epoxides, acid anhydrides, carboxylic acids, esters, amides, thiols, alcohols and amines, in particular double bonds.

Thus, the polymers can be obtained from diene units, preferably conjugated diene and units such as vinyl acetate, methyl acrylate, butyl acrylate, maleic anhydride, glycidyl methacrylate, glycidyl acrylate, norbornene units. The polymers can also be obtained from diene units, preferably conjugated diene and units comprising double bonds. Polymers such as ethylene/propene/diene (EPDM) terpolymers, acrylonitrile/butadiene/styrene (ABS) terpolymers can be used. The polymers according to the invention obtained from at least one diene unit (or monomer), preferably conjugated diene, can also be hydrogenated, or partially hydrogenated, after polymerization.

The preferred polymers P are the polymers which have double bonds along their main chain. There can be mentioned for example homopolymers such as polybutadienes or polyisoprenes. Preferred polymers are also the polymers resulting exclusively from the copolymerization of conjugated diene units and aromatic monovinyl hydrocarbon units.

Among the conjugated diene units, there can be mentioned for example, those comprising 4 to 8 carbon atoms per monomer, such as butadiene, 2-methyl-1,3-butadiene (isoprene), 2,3-dimethyl-1,3-butadiene, 1,3-pentadiene and 1,2-hexadiene, chloroprene. The preferred conjugated diene units are butadiene units. Among the aromatic monovinyl hydrocarbon units, there can be mentioned for example, styrene, o-methyl styrene, p-methyl styrene, p-tert-butylstyrene, 2,3 dimethyl-styrene, alpha-methyl styrene, vinyl naphthalene, vinyl toluene, vinyl xylene. The preferred aromatic monovinyl hydrocarbon units are styrene units. The preferred polymers are the polymers resulting from the copolymerization of butadiene units and styrene units.

The reactive functions present on the polymer P after the polymerization reaction are preferably double bonds. According to the type of polymerization of the conjugated diene units via a 1-2 addition or via a 1-4 addition, the reactive double bonds of polymer P are of two types. The first results from the 1-4 addition of the conjugated dienes and the second from the 1-2 addition of the conjugated dienes.

The double bonds originating from the 1-2 addition of the conjugated dienes are pendant vinyl double bonds. The reactive functions present on the polymer P after the polymerization reaction are preferably pendant vinyl double bonds originating from the 1-2 addition of conjugated diene units. In particular, the reactive functions present on the polymer P after the polymerization reaction are pendant vinyl double bonds originating from the 1-2 addition of butadiene units.

The preferred polymers P are styrene- and butadiene-based block copolymers. Advantageously, they have a styrene content by weight ranging from 5% to 50% and a butadiene content by weight ranging from 50% to 95%. Advantageously, the polymer P has a pendant vinyl double-bond units originating from the 1-2 addition of butadiene content by weight ranging from 5% to 50%. The average molecular mass by weight of the polymer P can be comprised, for example, between 10,000 and 600,000 daltons and is situated preferably between 30,000 and 400,000 daltons.

The graft G comprises a branched, linear or saturated hydrocarbon chain, of at least 18 carbon atoms, preferably at least 22 carbon atoms, preferably at least 30 carbon atoms. Preferably the saturated hydrocarbon chain of the graft is linear. The saturated hydrocarbon chain of the graft has a general formula $C_nH_{2n+1}$, where n represents an integer greater than or equal to 18, preferably varying from 18 to 110, preferably varying from 18 to 90, preferably varying from 18 to 50, preferably varying from 20 to 40, preferably 25 to 30. Preferably, the graft G has the general formula $C_nH_{2n+1}$—XH where X represents a sulphur atom, an oxygen atom or an NH group and n represents an integer varying from 18 to 110, preferably varying from 18 to 90, preferably varying from 18 to 50, preferably varying from 20 to 40, preferably 25 to 30.

When X is a sulphur atom, the graft G has the general formula $CnH2n+1$—SH, and n varies from 18 to 110, preferably 18 to 90, preferably 18 to 50, preferably 20 to 40, preferably 25 to 30. When X is an oxygen atom, the graft G has the general formula $C_nH_{2n+1}$—OH, and n varies from 18 to 110, preferably 18 to 90, preferably 18 to 50, preferably 20 to 40, preferably 25 to 30. When X represents the NH group, the graft G has the general formula $C_nH_{2n+1}$—$NH_2$, and n varies from 18 to 110, preferably 18 to 90, preferably 18 to 50, preferably 20 to 40, preferably 25 to 30.

Preferably, the graft G of general formula $C_nH_{2n+1}$—XH is chosen for example from the following thiols: $C_{18}H_{37}$—SH, $C_{40}H_{81}$—SH, $C_{70}H_{141}$—SH and/or $C_{90}H_{181}$—SH. The graft G can also have, as general formula, the following general formula: $C_nH_{2n+1}$—$(OCH_2CH_2)_m$—XH where X represents a sulphur atom, an oxygen atom or an NH group, n represents an integer varying from 18 to 110 and m represents an integer varying from 1 to 20, preferably n represents an integer varying from 18 to 90, preferably varying from 18 to 50, preferably varying from 20 to 40, preferably 25 to 30.

Preferably, the graft G of general formula $C_nH_{2n+1}$—$(OCH_2CH_2)_m$—XH is an alcohol (X=O), chosen for example from the following alcohols:

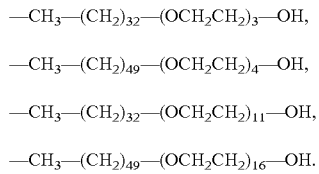

According to a preferred embodiment of the invention the graft polymer GP is obtained by reaction between at least one double bond of polymer P, in particular a pendant vinyl double bond originating from the 1-2 addition of a conjugated diene of polymer P and a function chosen from the thiol, alcohol or amine functions of the graft G. In particular, the graft polymer GP is obtained by reaction between at least one pendant vinyl double bond originating from the 1-2 addition of a conjugated diene unit of polymer P, and a thiol function, preferably terminal, of a graft G. In particular, the graft polymer GP is obtained by reaction between at least one pendant vinyl double bond originating from the 1-2 addition of a butadiene unit of polymer P, and a thiol function, preferably terminal, of a graft G.

More preferably, the graft polymer GP is obtained by reaction between at least one pendant vinyl double bond originating from the 1-2 addition of a butadiene unit of polymer P, and a graft G of general formula $C_nH_{2n+1}$—XH where X represents a sulphur atom, an oxygen atom or an NH group and n represents an integer varying from 18 to 110, preferably varying from 18 to 90, preferably varying from 18 to 50, preferably varying from 20 to 40, preferably 25 to 30. More preferably, the graft polymer GP is obtained by reaction between at least one pendant vinyl double bond originating from the 1-2 addition of a butadiene unit of polymer P, and a graft G chosen from the following thiols: $C_{18}H_{37}$—SH, $C_{40}H_{81}$—SH1 $C_{70}H_{141}$—SH and/or $C_{90}H_{181}$—SH.

According to another preferred embodiment of the invention the graft polymer GP is obtained by reaction between at least one double bond of polymer P, in particular a pendant vinyl double bond originating from the 1-2 addition of a conjugated diene of the polymer P and an alcohol function, preferably terminal, of a graft G. More preferably, the graft polymer GP is obtained by reaction between at least one pendant vinyl double bond originating from the 1-2 addition of a butadiene unit of polymer P, and a graft G of general formula $C_nH_{2n+1}$—$(OCH_2CH_2)_m$—OH where n represents an integer varying from 18 to 110 and m represents an integer varying from 1 to 20, preferably n represents an integer varying from 18 to 90, preferably varying from 18 to 50, preferably varying from 20 to 40, preferably 25 to 30.

More preferably, the graft polymer GP is obtained by reaction between at least one pendant vinyl double bond originating from the 1-2 addition of a butadiene unit of polymer P, and a graft G chosen from the following alcohols:

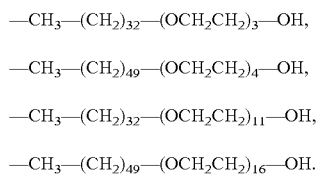

The scope of the invention is not exceeded when the polymer P reacts firstly with a reactive species comprising a function chosen from the following functions: alkenes, dienes, epoxides, acid anhydrides, carboxylic acids, esters, carboxylic acids, thiol, alcohol and/or primary amine and only subsequently with a graft G as defined in the invention. According to the invention, the polymer GP comprises at least one side graft. Preferably the average number of grafts per main polymer chain is greater than 2.

Preferably, the polymer GP comprises from 3 to 55% in moles of grafts G, preferably 5 to 35% in moles, more preferably 10 to 20% in moles. Preferably, the polymer GP comprises from 10 to 55% by mass of grafts G, preferably 15 to 35% by mass, more preferably 10 to 20% by mass. When the polymer GP is a polymer having a high content by weight of pendant vinyl double-bond units originating from the 1-2 addition of the butadiene (for example of the order of 30% by mass, instead of 10% by mass for a polymer GP is a polymer having a high content by weight of pendant vinyl double-bond units originating from the 1-2 addition of the butadiene), the grafting rate is greater and the polymer GP comprises more grafts G.

These grafts can all have the same chemical structure or have different chemical structures within the graft polymer GP. Grafts having a different chain length can therefore coexist within a single main polymer chain. Thus, for example, the graft polymer GP can comprise at least one graft comprising a $C_{18}H_{37}$— side chain and at least one graft comprising a $C_{70}H_{141}$— side chain.

Without being bound by the following theory, these are the grafts G allowing thermoreversible crosslinking. The crosslinking results from assembling the graft polymers GP via the grafts G (more precisely via the hydrocarbon chains of the grafts G). This assembly allows crystalline areas to be defined between the grafts G of the graft polymer GP. These crystalline areas are stables at low temperature. When the temperature increases, these crystalline areas melt, recrystallizing when the temperature reduces. At low temperature the interactions of the crystalline areas of the grafts G bring together the chains of the graft polymer GP which are then crosslinked. When the crystalline areas of the grafts melt, the chains of the graft polymer GP move apart, they are no longer crosslinked.

Thus, when a bitumen with the graft polymers GP according to the invention is used as an additive, bitumen/polymer compositions are obtained which are reversibly, and more particularly thermoreversibly crosslinked. By thermoreversible crosslinking of the bitumen/polymer compositions according to the invention, is meant a crosslinking demonstrated by the following phenomena:

at low temperature, for example at working temperatures, the grafts G of the cograft polymers GP are combined and form crosslinking points. The polymer network formed confers good mechanical properties on the bitumen/polymer composition, in particular with regard to flexibility and cohesion.

when hot, a temperature increase causes the rupture of the crosslinking points and as a result the disassociation of the polymer chains. The polymer network disappears and the bitumen/polymer composition returns to a low viscosity and therefore a good fluidity.

a reduction in temperature allows the crosslinking points to reform. The phenomenon is thermoreversible.

The bitumen/polymer compositions according to the invention are constituted by at least one bitumen and at least one graft polymer GP. The graft polymers GP introduced into the bitumen have been described previously. The graft polymers GP represent 0.1 to 30% by weight with respect to the bitumen. According to a preferred implementation, the graft polymers GP represent from 1 to 10% by weight with respect to the bitumen, preferably, from 1 to 5% by weight with respect to the bitumen.

The bitumen/polymer compositions according to the invention can contain bitumens of different origins. There can be mentioned firstly the bitumens of natural origin, those contained in deposits of natural bitumen, natural asphalt or bituminous sands. The bitumens according to the invention are also the bitumens originating from the refining of crude oil. The bitumens originate from the atmospheric and/or vacuum distillation of oil. These bitumens being able to be optionally blown, visbroken and/or de-asphalted. The bitumens can be bitumens of hard or soft grade. The different bitumens obtained by the refining processes can be combined with each other in order to obtain the best technical compromise.

The bitumens used can also be bitumens fluxed by the addition of volatile solvents, fluxes originating from oil, carbochemical fluxes and/or fluxes of vegetable origin. The fluxes used can comprise $C_6$ to $C_{24}$ fatty acids in acid, ester or amide form in combination with a hydrocarbon cut.

The invention relates to a process for the preparation of thermoreversibly crosslinked bitumen/polymer compositions. Two processes can be envisaged: a so-called ex-situ and a so-called in-situ process. By ex situ process is meant a process in which the grafting of the grafts G onto the polymer P is carried out apart from the bitumen, the polymer GP being obtained apart from the bitumen.

Obtaining a bitumen modified according to the so-called ex situ process comprises the following essential steps:
a) a bitumen is introduced into a receiving vessel equipped with mixing means, and the bitumen is taken to a temperature between 90 and 220° C., preferably between 140° C. and 180° C.,
b) from 0.1 to 30% by mass of a graft polymer GP according to the invention with respect to the mass of bitumen, preferably 0.1 to 10% is introduced.
c) throughout the process, the composition is heated at a temperature between 90 and 220° C., preferably between 140 and 180° C., under stirring, until a homogeneous final bitumen/polymer composition is obtained.

It can also be envisaged to obtain a modified bitumen according to the so-called in-situ process where the formation of the graft copolymer GP according to the invention is carried out in the bitumen. The so-called in-situ process comprises the following essential steps:
a) a bitumen is introduced into a receiving vessel equipped with mixing means, and the bitumen is taken to a temperature between 90 and 220° C., preferably between 140° C. and 180° C.,
b) from 0.1 to 30%, preferably 0.1 to 10% by mass of a polymer P is introduced, then from 0.1 to 30%, preferably 0.1 to 10% by mass of a graft G is introduced.

Throughout the process, the composition is heated at a temperature between 90 and 220° C., preferably between 140 and 180° C., under stirring, until a homogeneous final bitumen/polymer composition is obtained.

Various uses of the bitumen/polymer compositions obtained according to the invention are envisaged, in particular for the preparation of a bituminous binder, which can in turn be used for preparing a combination with aggregates, in particular road aggregates. Another aspect of the invention is the use of a bituminous composition in various industrial applications, in particular for preparing a sealing membrane, membrane or impregnation layer. With regard to highway applications, the invention relates in particular to bituminous mixes as materials for the construction and maintenance of road foundations and their surfacing, as well as for carrying out all road works. Thus, the invention relates for example to surface dressings, hot mixes, cold mixes, cold-cast mixes, gravel emulsions, base, binder, bonding and wearing courses, and other combinations of a bituminous binder and highway aggregate having particular properties such as anti-rutting courses, draining mixes, or cast asphalts (mixture of a bituminous binder and sand-type aggregates). With regard to the industrial applications of the bituminous compositions, there can be mentioned the production of sealing membranes, anti-noise membranes, insulating membranes, surface coatings, carpet tiles, impregnation layers, etc.

EXAMPLES

Preparation of the polymer GP

Three polymers GP according to the invention are prepared from a polymer P which is a styrene/butadiene block copolymer, having 25% by weight of styrene and 75% by weight of butadiene. This copolymer has a molecular mass by weight Mw of 128,000 Dalton, a polymolecularity index Mw/Mn of 1.11 and a content of pendant vinyl double-bond unit originating from the 1-2 addition of butadiene of 10% by mass with respect to the assembly of butadiene units. 50 ml of toluene, 2 g of polymer P described above are introduced into a reactor kept under a nitrogen atmosphere. Then 1.5 g of graft G and 10 mg of AIBN (azobisisobutyronitrile) are introduced into the reactor; the mixture is heated progressively to approximately 90° C. under stirring.

Three grafts are used: $C_{18}H_{37}$—SH ($G_1$), $C_{40}H_{81}$—SH ($G_2$), $C_{70}H_{141}$—SH ($G_3$). After 3 to 4 hours, the solution is cooled down to ambient temperature and the copolymer GP is precipitated using methanol and acetone. The graft polymers $PG_1$, $PG_2$ and $PG_3$ are obtained from grafts $G_1$, $G_2$ and $G_3$ respectively.

Bitumen

The bitumen is a bitumen of penetration grade 50 1/10 mm the characteristics of which correspond to the standard NF EN 12591.

Bitumen/Polymer Compositions $C_1$, $C_2$ and $C_3$ According to the Invention

Three bitumen/polymer compositions according to the invention are prepared from the graft polymers $PG_1$, $PG_2$ and $PG_3$ and the bitumen described above (ex-situ process). 35 g of bitumen is introduced into a reactor kept at 180° C. and equipped with a mechanical stirring system. The bitumen is heated at 185° C. and stirred for approximately 60 minutes. Then 1.8 g of the graft polymer $PG_1$, $PG_2$ or $PG_3$ obtained above is added. The mixture forms during a period of 4 hours under stirring. The bitumen/polymer compositions $C_1$, $C_2$ and $C_3$ are obtained from the graft polymers $PG_1$, $PG_2$ and $PG_3$ respectively.

Preparation of the Polymer GP in-situ and Bitumen/Polymer Compositions $C_4$, $C_5$, and $C_6$ According to the Invention Three further bitumen/polymer compositions according to the invention are prepared, starting from the in-situ preparation process. 35 g of bitumen described above it introduced into a reactor heated at 185° C. and stirred. The bitumen is heated and stirred for approximately 60 minutes. Then, 1.8 g of the polymer P (styrene-butadiene bi-block copolymer, having 25% by weight of styrene and 75% by weight of butadiene described above) and 1.8 g of graft G are added.

Three grafts are used: $C_{18}H_{37}$—SH ($G_1$), $C_{40}H_{81}$—SH ($G_2$), $C_{70}H_{141}$—SH ($G_3$). The mixtures are stirred for approximately 4 hours. The compositions $C_4$, $C_5$ and $C_6$ are obtained from the grafts $G_1$, $G_2$ and $G_3$ respectively.

A Control Bitumen/Polymer Composition $T_1$

An irreversibly-crosslinked bitumen/polymer composition is also prepared as follows:

35 g of the above bitumen is introduced into a reactor. The bitumen is heated at 185° C. and stirred for approximately 60 minutes. Then 1.8 g of the styrene-butadiene bi-block copolymer, having 25% by weight of styrene and 75% by weight of butadiene described above is added. The mixture is stirred and heated at 185° C. for approximately 4 hours. Then 50 mg of sulphur is added. The mixture is stirred and heated at 185° C. for 1 hour 30 minutes.

The Table below shows the physical characteristics of the compositions according to the invention and of the control composition.

Results

|  | $C_1$ | $C_2$ | $C_3$ | $T_1$ |
|---|---|---|---|---|
| Penetrability (0.1 mm) (1) | 52 | 37 | 32 | 43 |
| RBT (° C.) (2) | 51.8 | 74.2 | 83.8 | 61.6 |
| Viscosity at 80° C. | 35.0 | 38.2 | 58.10 | 59.00 |
| Viscosity at 100° C. | 6.10 | 5.50 | 11.40 | 14.94 |
| Viscosity at 120° C. | 1.60 | 1.10 | 2.82 | 4.27 |
| Viscosity at 140° C. | 0.59 | 0.41 | 0.97 | 1.48 |
| Viscosity at 160° C. | 0.26 | 0.18 | 0.42 | 0.63 |
| Viscosity at 180° C. | 0.14 | 0.10 | 0.22 | 0.37 |
| Viscosity at 200° C. | 0.08 | 0.05 | 0.12 | 0.18 |
| Max. elongation at 5° C. (%) (3) | 701 | 520 | 150 | 697 |
| Stress (daN/cm$^2$) (3) | 1.0 | 1.3 | 1.3 | 1.3 |

(1) According to standard EN 1426
(2) Ring and Ball temperature, according to standard EN 1427
(3) Traction test at 5° C., according to standard NF T 66-038, with a stretching rate of 500 mm/min.

The results of this table show that the viscosities at 80° C. to 200° C. of the bitumen/polymer compositions according to the invention are always less than those of the control composition $T_1$. The bitumen/polymer compositions according to the invention from 80° C. are therefore less viscous than a sulphur-crosslinked bitumen/polymer composition. Low viscosities at processing temperatures are thus reached using the bitumen/polymer compositions according to the invention.

Moreover, it is noted that the elastic properties of the bitumen/polymer compositions according to the invention depend on the chain length of the graft grafted on the polymer. The best elasticity/viscosity compromise is obtained for the compositions $C_1$ and $C_2$ in which the elastic properties are of the same order of magnitude as those of a sulphur-crosslinked bitumen/polymer composition (maximum elongation under traction and stress equivalent for $C_1$, $C_2$ and $T_1$). At operating temperatures, the bitumen/polymer compositions according to the invention, in particular $C_1$ and $C_2$, are therefore elastic while having a reduced viscosity at processing temperatures. Similarly, it is noted that the Ring and Ball temperatures of the bitumen/polymer compositions according to the invention depend on the chain length of the graft grafted on the polymer. In the case of the compositions $C_2$ and $C_3$, these values are even greater than that of the sulphur-crosslinked control $T_1$.

The invention claimed is:

1. A bitumen/polymer composition comprising at least one bitumen and at least one graft polymer comprising:
    a polymer main chain resulting from the polymerization of butadiene units and styrene units and;
    at least one side graft linked to the polymer main chain, the graft comprising a branched or linear, saturated hydrocarbon chain, having at least 18 carbon atoms, the graft polymer being obtained by reaction between at least one double bond of polymer and a thiol function of the graft.

2. The bitumen/polymer composition according to claim 1, in which the polymer main chain of the polymer comprises pendant vinyl double bonds originating from the 1-2 addition of butadiene units.

3. The bitumen/polymer composition according to claim 2, in which the polymer has a content by weight of pendant vinyl double-bond units originating from the 1-2 addition of butadiene from 5% to 50%.

4. The bitumen/polymer composition according to claim 1, in which the graft has the general formula $C_nH_{2n+1}$—XH where X represents a sulphur atom and n represents an integer varying from 18 to 110.

5. The bitumen/polymer composition according to claim 1, in which the graft has the general formula $C_nH_{2n+1}$—$(OCH_2CH_2)_m$—XH where X represents a sulphur atom, n represents an integer varying from 18 to 110 and m represents an integer varying from 1 to 20.

6. The bitumen/polymer composition according to claim 1, in which the graft polymer is obtained by reaction between at least one pendant vinyl double bond originating from the 1-2 addition of butadiene unit of polymer and a thiol, function of the graft.

7. The bitumen/polymer composition according to claim 1, in which the graft polymer comprises at least two grafts per main polymer chain.

8. The bitumen/polymer composition according to claim 1, in which the graft polymer content by weight with respect to the bitumen is from 0.1 to 30%.

9. The bitumen/polymer composition according to claim 1, also comprising at least one fluxing agent.

10. A process for the ex situ preparation of bitumen/polymer compositions according to claim 1, the process comprising:
    a) introducing a bitumen into a receiving vessel equipped with a mixer, and taking the bitumen to a temperature comprised between 90 and 220° C.,
    b) introducing from 0.1 to 30% by mass of a graft polymer with respect to the mass of bitumen, and
    c) heating the composition at a temperature comprised between 90 and 220° C., under stirring, until a homogeneous final bitumen/polymer composition is obtained.

11. A process for the in situ preparation of bitumen/polymer compositions according to claim 1, the process comprising:
    a) introducing a bitumen into a receiving vessel equipped with a mixer, and taking the bitumen to a temperature between 90 and 220° C.,
    b) introducing from 0.1 to 30% by mass of a polymer and from 0.1 to 30% by mass of a graft with respect to the mass of bitumen, and
    c) heating the composition at a temperature comprised between 90 and 220° C. under stirring, until a homogeneous final bitumen/polymer composition is obtained.

12. A bituminous binder obtained from a bitumen/polymer composition according to claim 1.

13. The bituminous binder according to claim 12, wherein said binder is in anhydrous form, in the form of an emulsion or in the form of fluxed bitumen.

14. A mixture for producing a surface dressing, a hot mix, a cold mix, a cold-cast mix or an emulsion gravel, said mixture comprising aggregates and at least a bitumen/polymer composition according to claim 1.

15. The bitumen/polymer composition according to claim 1, in which the thiol function of the graft is terminal.

* * * * *